United States Patent
Marupaduga (12)

(10) Patent No.: US 11,265,943 B1
(45) Date of Patent: Mar. 1, 2022

(54) USE OF FADING AS BASIS TO CONTROL WHETHER TO USE BLIND ADDITION OR RATHER THRESHOLD-BASED ADDITION WHEN CONFIGURING DUAL CONNECTIVITY

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 17/069,058

(22) Filed: Oct. 13, 2020

(51) Int. Cl.
*H04W 24/10* (2009.01)
*H04W 76/15* (2018.01)
*H04B 17/318* (2015.01)

(52) U.S. Cl.
CPC .......... *H04W 76/15* (2018.02); *H04B 17/318* (2015.01); *H04W 24/10* (2013.01)

(58) Field of Classification Search
CPC ..... H04W 76/15; H04W 24/10; H04B 17/318
See application file for complete search history.

(56) References Cited

U.S. PATENT DOCUMENTS

| | | | |
|---|---|---|---|
| 9,900,925 B2 | 2/2018 | Fujishiro et al. | |
| 10,149,170 B2 | 12/2018 | Youn et al. | |
| 10,659,978 B1 | 5/2020 | Marupaduga et al. | |
| 2003/0124983 A1* | 7/2003 | Parssinen .............. | H04W 52/54 455/69 |
| 2012/0190395 A1 | 7/2012 | Pan et al. | |
| 2014/0064146 A1 | 3/2014 | Wang et al. | |
| 2015/0319655 A1 | 11/2015 | Koskinen et al. | |
| 2017/0202003 A1 | 7/2017 | Johansson et al. | |
| 2017/0332301 A1 | 11/2017 | Horn et al. | |
| 2018/0279218 A1 | 9/2018 | Park et al. | |
| 2019/0037625 A1 | 1/2019 | Shih et al. | |
| 2020/0092756 A1* | 3/2020 | Smith ................... | H04W 28/20 |
| 2020/0163144 A1 | 5/2020 | Ryoo et al. | |

* cited by examiner

*Primary Examiner* — Chuong A Ngo

(57) ABSTRACT

A method and system for controlling an operational mode of a first access node where the first access node provides a first cell and a second access node provides a second cell. An example method could include (i) determining a level of fading of the second cell, (ii) using the determined level of fading of the second cell as a basis to decide whether the first access node should operate in a blind-addition mode or rather a threshold-based-addition mode for adding a secondary connection in the second cell for a UE having a primary connection with the first access node in the first cell, and (iii) causing the first access node to operate in the decided mode.

20 Claims, 5 Drawing Sheets

USE OF FADING AS BASIS TO CONTROL WHETHER TO USE BLIND ADDITION OR RATHER THRESHOLD-BASED ADDITION WHEN CONFIGURING DUAL CONNECTIVITY

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system could engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on at least one radio-frequency (RF) carrier. Each such carrier could be frequency division duplex (FDD), with separate frequency channels for downlink and uplink communication, or time division duplex (TDD), with a single frequency channel multiplexed over time between downlink and uplink use. And the coverage provided by a given access node on a given carrier could be considered to define a respective "cell".

Further, on the downlink and uplink, the coverage of each cell could define an air interface configured in a specific manner to define physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs.

In addition, certain resource elements on the example air interface could be reserved for special purposes. For instance, on the downlink, certain resource elements could be reserved to carry reference signals or the like that UEs could measure in order to determine coverage strength, and other resource elements could be reserved to carry other control signaling such as PRB-scheduling directives and acknowledgement messaging from the access node to UEs. And on the uplink, certain resource elements could be reserved to carry random-access signaling from UEs to the access node, and other resource elements could be reserved to carry other control signaling such as PRB-scheduling requests, acknowledgement messaging, and channel-quality reports from UEs to the access node.

Overview

When a UE enters into coverage of such a system, the UE could detect threshold strong coverage of a cell provided by a given access node (e.g., a threshold strong reference signal broadcast by the access node in that cell) and could then engage in random-access and connection signaling with the access node to establish an air-interface connection, such as a Radio Resource Control (RRC) connection, through which the access node will then serve the UE in the cell.

Further, if the UE is not already registered for service with the core network, the UE could transmit to the access node an attach request, which the access node could forward to a core-network controller for processing. And the core-network controller and access node could then coordinate setup for the UE of at least one user-plane bearer, including an access-bearer portion that extends between the access node and a core-network gateway system that provides connectivity with a transport network and a data-radio-bearer (DRB) portion that extends over the air between the access node and the UE.

Once the UE is connected and registered, the access node could then serve the UE with packet-data communications. For instance, when the gateway system receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could then transmit to the UE in a control region of that subframe a Downlink Control Information (DCI) message that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI message that designates those upcoming PRBs. And the UE could then accordingly transmit the transport block to the access node in the designated PRBs.

While connected with and served by the access node, the UE could also regularly evaluate the quality of its coverage from the access node and could transmit associated coverage-quality reports to the access node, to assist in the access node in serving of the UE.

For example, the UE could regularly evaluate its reference signal receive strength (RSRP) from the access node and transmit to the access node an RSRP measurement reports, which the access node might use as a basis to trigger handover of the UE when appropriate. And as another example, based on RSRP, signal-to-noise ratio (SINR), signal-to-interference-plus-noise ratio (SINR), and/or one or more other factors, the UE could regularly evaluate the quality of its wireless communication channel with the access node and transmit to the access node channel quality indicator (CQI) reports, which the access node might use as a basis to set a modulation and coding scheme (MCS) that will be used for air-interface communication with the UE.

When the industry advances from one generation of wireless technology to the next, or in other scenarios, networks and UEs may also support dual-connectivity service, where a UE is served on multiple co-existing connections, perhaps according to different respective RATs.

For instance, a network could include a first access node configured to provide coverage and service according to a first RAT and a second access node configured to provide overlapping coverage and service according to a second RAT, and a UE positioned concurrently within coverage of both the first and second access nodes could have a first radio configured to engage in service according to the first RAT and a second radio configured to engage in service according to the second RAT. With this arrangement, the UE may be able to establish a first air-interface connection with the first access node according to the first RAT and a second air-interface connection with the second access node according to the second RAT, and the access nodes may then concurrently serve the UE over those connections according to their respective RATs.

Such dual connectivity (or "non-standalone" (NSA) connectivity) could help facilitate increased peak data-rate of communications, by multiplexing the UE's communications across the multiple air-interface connections. Further or alternatively, dual connectivity may provide other benefits compared with serving a UE on a single connection (as "standalone" (SA) connectivity).

In a representative dual-connectivity implementation, one of the access nodes could operate as a master node (MN), responsible for coordinating setup, management, and teardown of dual-connectivity service for the UE and functioning as an anchor point for core-network control signaling related to the dual-connected UE. And each of one or more other access nodes could operate as a secondary node (SN) mainly to provide additional connectivity and increased aggregate bandwidth for the UE.

When a UE that supports dual-connectivity service enters into coverage of such a system, the UE could initially scan for and detect a cell provided by the first-RAT access node and then engage in signaling to establish a primary connection between the UE and that access node in that cell as discussed above. And perhaps having determined from profile data that the UE is dual-connectivity-capable, the UE's serving access node, acting as an MN, could then engage in a process to set up dual connectivity for the UE, so that the UE can be served currently by the MN and the SN.

Setting up dual connectivity for the UE could involve the MN engaging in an SN-addition process to add for the UE a secondary connection with the SN, so that the MN and SN can then cooperatively provide the UE with dual-connectivity service over their respective connections with the UE. In an example implementation, for instance, the MN could transmit to the SN an SN-addition request message, providing RRC and DRB configuration information and other information for the secondary connection, and the SN could then responsively allocate resources for the secondary connection in the SN's cell and could reply to the MN with an SN-addition-request acknowledge message. The MN could then transmit to the UE an RRC connection-reconfiguration message providing the UE with parameters of the secondary connection. And the UE could respond to the MN with a reconfiguration-complete message, which the MN could forward to the SN. Further, the UE could then engage in random-access signaling with the SN so as to complete establishment of the secondary connection for the UE.

In addition, for some dual-connectivity implementations, the MN could also engage in signaling process to transfer the UE's access bearer from being between the gateway system and the MN to instead being between the gateway system and the SN. For instance, the MN could include in its SN-addition request to the SN information about the access bearer, and the MN could transmit to the core-network controller an access-bearer modification request and the core-network controller could coordinate transfer of the access-bearer from the MN to the SN.

With dual connectivity so configured by way of example, the MN and SN could then serve the UE with packet-data communications over their respective connections with the UE, with each access node coordinating air-interface communication in the manner described above. For instance, downlink data could flow over the UE's access bearer from the gateway system to the SN, the SN could transmit a portion of the data over the UE's secondary connection to the UE, and the SN could send another portion of the data to the MN, which the MN could transmit over the UE's primary connection to the UE. Likewise, when the UE has data to transmit, the UE could transmit a portion of the data over the UE's primary connection to the MN, which the MN could forward to the SN and the SN could transmit over the UE's access bearer to gateway system, and the UE could transmit another portion of the data over the UE's secondary connection to the SN, which the SN could transmit over the UE's access bearer to the gateway system.

While the above or another process of configuring dual connectivity for a UE may work well practice, one technical issue with the process is how the MN would determine in the first place that the secondary should be established for the UE in the SN's cell, and thus that the MN should engage in the SN-addition process to configure, or trigger configuration of, that secondary connection for the UE.

In practice, the MN may have a choice of at least two different SN-Addition processes to apply. One option, referred to as "blind addition," involves the MN working to add for the UE the secondary connection in the SN's cell without first requiring as a condition precedent that the UE report being within threshold strong coverage of the SN's cell. And the other option, referred to as "threshold-based addition," involves the MN working to add for the UE the secondary connection in the SN's cell if and only if the UE reports being within threshold strong coverage of the SN's cell, i.e., contingent on the UE reporting being within threshold strong coverage of the SN's cell.

With blind addition, the MN could simply proceed with signaling in an effort to add the secondary connection for the UE in the SN's cell, on possible grounds that coverage provided by the MN's cell overlaps sufficiently with coverage provided by the SN's cell, so that, if the UE is within good coverage of the MN's cell, the UE may also be within good coverage of the SN's cell. Whereas, with threshold-based addition, the MN could transmit to the UE a measurement object that would cause the UE to report to the MN if and when the UE detects at threshold strong coverage of the SN's cell, and then, if and when the UE provides that measurement report, the MN would proceed with signaling to add the secondary connection for the UE.

Disclosed herein is a mechanism to control which SN-addition process an MN will use in a given instance, such as to control whether the MN will apply the blind-addition process or rather the threshold-based-addition process.

In accordance with the disclosure, a computing system will select between the MN applying the blind-addition process and the MN applying the threshold-based-addition process, with the selection being based at least on fading in the SN's cell—such as an extent to which UEs served by the SN's cell tend to experience fluctuating coverage quality from the SN. And based on this selection, the computing system will then cause the MN to operate in a mode in which the MN will apply the selected process rather than the other process.

In an example implementation, the MN could operate in a first, default mode in which the MN is set to apply the blind-addition process, rather than the threshold-based-addition process, with respect to the SN's cell. But if and when (e.g., at times when) there is a high level of fading in the SN's cell, particularly if the fading involves fluctuation to and from relatively poor coverage of the SN, the computing system could cause the MN to instead operate in a second mode in which the MN is set to apply the threshold-based-addition process, rather than the blind-addition process, with respect the SN's cell.

Optimally, applying the threshold-based-addition process as to the SN's cell if and when there is a high level of fading in the SN's cell could help to better ensure that the dual-connectivity setup process will work well. If and when there is a high level of fading in the SN's cell, the assumption that any given UE is in good coverage of the SN's cell may be less certain. And if the UE is actually in poor coverage of the SN's cell, an attempt to add a secondary connection for the UE in the SN's cell may fail, which could lead to problems. Applying the threshold-based-addition process in that scenario could help reduce the likelihood of that problem, by increasing the likelihood that the UE is actually within good coverage of the SN's cell before attempting to add for the UE a secondary connection in that cell.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC).

With EN-DC, a 4G LTE access node (e.g., 4G evolved Node-B (eNB)) functions as the MN, and a 5G NR access node (e.g., 5G next-generation Node-B (gNB)) functions the SN. Thus, a UE could first establish a standalone 4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations, including possibly a single-RAT dual-connectivity arrangement. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations.

Figure 1:
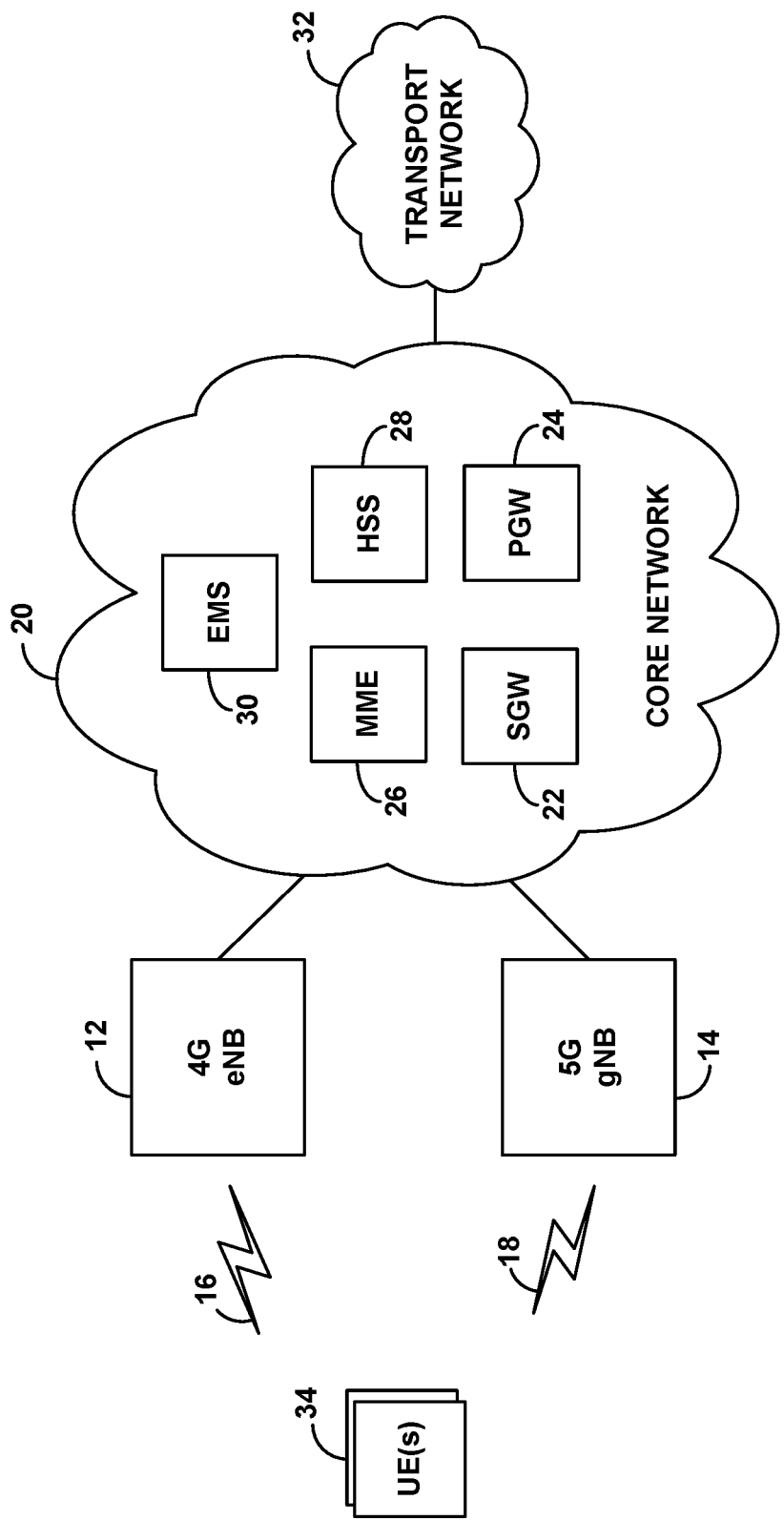
FIG. 1 is a simplified block diagram of an example network arrangement in which aspects of the present disclosure can be implemented.

Referring to the drawings, FIG. 1 is a simplified block diagram of an example network arrangement having a 4G eNB 12 and a 5G gNB 14.

These access nodes could be macro access nodes of the type configured to provide a wide range of coverage or could take other forms, such as small cell access nodes, relays, femtocell access nodes, or the like, possibly configured to provide a smaller range of coverage, and could differ in form from each other. Further, the access nodes could be collocated with each other, e.g., at a common cell site with collocated RF points of origin, or could be separately located. Either way, the access nodes could be optimally configured to provide substantially overlapping coverage in order to support EN-DC service.

As a specific example, the 4G eNB 12 could be a macro access node that provides wide 4G coverage area, and the 5G gNB 14 could be a small cell access node that provides a smaller 5G coverage are within the 4G coverage area. As another example, the 4G eNB 12 and 5G gNB 14 could both be macro access nodes and could be collocated with each other and configured to provide coverage in largely the same direction as each other. Other examples are possible as well.

In the example illustrated, the 4G eNB 12 is configured to provide 4G coverage and service in a 4G cell 16, and the 5G gNB 14 is configured to provide coverage and service in a 5G cell 18. As noted above, each of these cells could be defined on a carrier, which could be FDD or TDD. Further, the cells could operate on different carriers than each other, or, with dynamic spectrum sharing, could operate on the same carrier as each other.

To facilitate providing service and coverage in these cells, the access nodes could have a respective antenna structures, such as an antenna arrays, that are configured to transmit and receive electromagnetic signals in a region defined by an antenna pattern or radiation pattern, or the access nodes could share portions of a common antenna array for this purpose. Further, the access nodes could include other communication equipment, such as baseband units, radio heads, power amplifiers, and the like.

The air interface on each of these carriers could be structured as described above by way of example, being divided over time into frames, subframes, and symbol time segments, and over frequency into subcarriers, thus defining an array of air-interface resource elements grouped into PRBs allocable by the respective access node as noted above, for use to carry data to or from served UEs. Carrier-structure and/or service on the 4G and 5G air-interfaces, however, could differ from each other in various ways now known or later developed, such as with one implementing variable subcarrier spacing and the other having fixed sub-carrier spacing, with one having flexible TDD configuration and the other having fixed TDD configuration, with one having different subcarrier spacing and/or symbol time segment length than the other, and/or with one making different use of MIMO technologies than the other, among other possibilities.

In the example arrangement of FIG. 1, the 4G eNB 12 and 5G gNB 14 are both interfaced with a core network 20, which could be a packet-switched network such as an Evolved Packet Core (EPC) network (e.g., 4G core) or Next Generation Core (NGC) network (e.g., 5G core), among other possibilities. In the example shown, for instance, the core network 20 could be an EPC network including a serving gateway (SGW) 22, a packet data network gateway (PGW) 24, a mobility management entity (MME) 26, a home subscriber server (HSS) 28, and an element management system (EMS) 30, although other arrangements are possible as well. This arrangement could support communication between various entities through virtual packet tunnels or the like.

In an example implementation, without limitation, each access node could have an interface with the SGW 22, the SGW 22 could have an interface with the PGW 24, and the PGW 24 could provide connectivity with a transport network 32 such as the Internet. In addition, each access node could have an interface with the MME 26, and the MME 26 could have an interface with the SGW 22, so that the MME 26 could coordinate setup of bearers for UEs to enable the UEs to engage in packet-data communication via 4G and 5G. Alternatively, just the 4G eNB 12 might have an interface with the MME 26 and may function as an anchor for control signaling with the MME 26 both for 4G service and EN-DC service. Further, the access nodes could have an interface with each other.

Still further, the HSS 28 could store or have access to UE profile records, which could specify service-subscription plans, UE configurations, and/or other such UE capability information, such as whether a UE is EN-DC capable for instance. And the EMS 30 could operate as a central repository of operational data for the wireless communication network and to control and manage operation of various network elements such as the access nodes.

FIG. 1 also illustrates a number of example UEs 34 that may from time to time be within coverage of 4G eNB 12 and 5G gNB 14. Each of these UEs could take any of the forms noted above, among other possibilities. Further, some or all of the UEs could be equipped with a 4G LTE radio, a 5G NR radio, and associated circuitry and logic that enables the UEs to engage in 4G LTE service, 5G NR service, and EN-DC service. And some of the UEs might be equipped with just a 4G LTE radio and associated circuitry and logic that enables the UEs to engage in 4G LTE service, or just a 5G LTE radio and associated circuitry and logic that enables the UEs to engage in just 5G NR service.

In line with the discussion above, when a 4G-capable UE initially enters into coverage of this network, the UE could discover coverage of the 4G eNB's cell 16, such as by scanning predefined 4G carriers to detect coverage and then determining that a reference signal of 4G cell 16 is strong enough to justify connecting. The UE could then engage in random-access signaling and RRC signaling with the 4G eNB 12 to establish 4G connection between the UE and the 4G eNB 12, and the 4G eNB 12 could establish a context record indicating the state of the UE's 4G connection and service.

With its 4G connection established, if the UE is not already registered with the core network 20, the UE could then transmit to the 4G eNB 12 an attach request message, which the 4G eNB 12 could forward to the MME 26 for processing. And upon authenticating and authorizing the UE for service, the MME 26 and 4G eNB 12 could coordinate setup for the UE of at least one user-plane bearer. For instance, the MME 26 could engage in signaling with the 4G eNB 12 and the SGW 22 to coordinate setup for the UE of an S1-U packet tunnel between the 4G eNB 12 and the SGW 22, and the SGW 22 could responsively engage in signaling with the PGW 24 to coordinate setup for the UE of an associated S5 packet tunnel between the SGW 22 and the PGW 24. Further, the 4G eNB 12 could engage in signaling with the UE to establish a DRB and other bearer configuration parameters for the UE.

In addition, in relation to the UE's connection and/or attachment process or at another time, the 4G eNB 12 could also obtain capabilities data regarding the UE and could store the capabilities data in the UE context record for reference while serving the UE. For instance, during the attachment process, the MME 26 could obtain this data from the HSS 28 and could convey the data to the 4G eNB 12 for storage. Alternatively or additionally, the 4G eNB 12 could transmit to the UE an RRC message carrying a UE-capability enquiry, and the UE could respond to the 4G eNB 12 with a "UE capability information" information element (IE) specifying UE capabilities data. And this capabilities data could indicate whether the UE supports EN-DC.

If the UE is EN-DC capable, the 4G eNB 12 could then work to configure EN-DC service for the UE. In line with the discussion above, this EN-DC setup process could include the 4G eNB 12, operating as the UE's MN (MeNB), engaging in signaling to add for the UE a secondary 5G connection in 5G cell 18, with the 5G gNB 14 operating as an SN (SgNB) for the UE. For instance, the 4G eNB 12 could transmit to the 5G gNB 14 an SgNB-Addition request to cause the 5G gNB to allocate resources for a 5G connection for the UE in 5G cell 18, and the 4G eNB 12 could receive an SgNB-Addition-Request acknowledge message from the 5G gNB 14 and then engage in associated RRC signaling with the UE, in response to which the UE could then engage in signaling with the 5G gNB 14 to complete establishment of the 5G connection. Further, the process could also include the 4G eNB 12 engaging in signaling such as described above to transfer to the UE's access bearer to the 5G gNB 14.

The 4G eNB 12 and 5G gNB 14 could then provide the UE with EN-DC service, concurrently serving the UE over their respective connections with the UE. Namely, the 4G eNB 12 could allocate PRBs of 4G cell 16 as needed to carry data over the 4G connection between the 4G eNB 12 and the UE, and the 5G gNB could allocate PRBs of 5G cell 18 as needed to carry data over the 5G connection between the 5G gNB 14 and the UE.

In addition to the 4G eNB 12 and 5G gNB 14 thus providing this example UE with EN-DC service in cells 16 and 18, the 4G eNB 12 and 5G gNB 14 might also serve one or more other UEs with EN-DC service in cells 16 and 18, the 4G eNB 12 might also serve one or more other UEs with standalone 4G service in cell 16 (e.g., where UEs connect with and are served by just the 4G eNB 12 possibly in the manner discussed above), and the 5G gNB 14 might also serve one or more other UEs with standalone 5G service (e.g., where UEs connect with and are served by just the 5G gNB 14 possibly in the manner discussed above).

In line with the discussion above, UEs that are served by any such access node may from time to time (e.g., periodically and/or in response to other triggers) report to the access node their coverage quality from the access node, such as their RSRP or CQI for instance. Thus, each UE served by the 4G eNB 12 in cell 16, whether with standalone 4G connectivity or as part of EN-DC, may regularly report to the 5G eNB 12 the UE's coverage quality of cell 16. And each UE served by the 5G gNB 14 in cell 18, whether with standalone 5G connectivity or as part of EN-DC, may regularly report to the 5G gNB 14 the UE's coverage quality of cell 18. As noted above, the serving access node could use these or other coverage quality reports in various ways when serving the UE, such as to trigger handover and/or to set an MCS for air-interface communication.

Further, an access node serving a UE may from time to time evaluate the UE's coverage quality in other ways. For example, the access node may evaluate uplink signal strength from the UE and/or evaluate or receive reports of bit error rate, block error rate, packet-error rate, retransmission rate, or the like, regarding air-interface communication between the UE and the access node. And the access node may likewise use such coverage quality information in various ways when serving the UE.

In accordance with the present disclosure, as discussed above, the 4G eNB 12 could operate in either of at least two modes with respect to adding secondary 5G connectivity in 5G cell 18 for EN-DC service: (i) a blind-addition-mode or (ii) a threshold-based-addition mode.

In the blind-addition mode, the 4G eNB 12 would simply proceed to add for a UE a secondary 5G connection in 5G cell 18 without requiring as a condition precedent that the UE report being within threshold strong coverage of the 5G cell 18. Whereas, in the threshold-based-addition mode, the 4G eNB 12 would require, as a condition precedent to adding that secondary 5G connection in 5G cell 18, that the UE report being within threshold strong coverage of the 5G cell 18.

Specifically with threshold-based-addition, for instance, the 4G eNB 12 could transmit to the UE (e.g., in an RRC message) a B1 (inter-RAT) measurement object that directs the UE to scan for 5G coverage on the carrier of 5G cell 18, and that designates at least one B1 measurement threshold. The B1 measurement threshold could be a minimum threshold level of reference signal receive power (RSRP) and/or reference signal receive quality (RSRQ) that the UE has from the 5G gNB 14 in cell 18 as a condition for the UE providing a B1 measurement report to the 4G eNB 12. For instance, the B1 measurement threshold could be RSRP on the order of at least −116 dBm to −95 dBm.

In line with the discussion above, a computing system could select which of at least these two modes the 4G eNB 12 should operate in, with the selection being based at least on a determined level fading of the 5G cell 18—e.g., a level of fluctuation of coverage quality of the 5G cell 18 experienced by UEs served by the 5G gNB 14 in the 5G cell 18. And based on that selecting, the computing system could then cause the 4G eNB 12 to operate in the selected mode rather than in the other mode.

The computing system that carries out this process could be at the 4G eNB 12 itself (e.g., a programmed host processor or other processing unit of the 4G eNB 12), in which case the 4G eNB 12 could refer to data that establishes the level of fading of the 5G cell 18, could select one of the modes based on that level of fading, and could set itself to operate in the selected mode, such as by configuring an operational parameter according to which the 4G eNB 12 would operate in the selected mode.

Alternatively, the computing system could be elsewhere, such as at the 5G gNB 14 or the EMS 30, in which case the computing system could refer to data that establishes the level of fading of the 5G cell 18, could select one of the modes based on that level of fading, and could transmit to the 4G eNB 12 a control signal to which the 4G eNB 12 is configured to respond by setting itself to operate in the selected mode as noted above.

The data that establishes the level of fading in the 5G cell 18 could include or be based on timestamped coverage quality records as to UEs served in the 5G cell 18. If the computing system is at the 4G eNB 12 or EMS 30 for instance, the 5G gNB 14 could timestamp such UE coverage quality records over time and could report these timestamped coverage-quality records to the computing system. Whereas, if the computing system is at the 5G gNB 14, the computing system could simply establish and maintain such timestamped coverage-quality records over time.

For each such UE, the data could include timestamped records of the UE's coverage quality of the 5G cell 18 over time, and the data or computing system could establish for the UE, from those timestamped records, a level of fading representing an extent to which the UE's coverage quality of the 5G cell 18 has fluctuated over time—with a higher level of fading corresponding with greater rate and/or magnitude of change of such coverage quality over time and a lower level of fading corresponding with lesser rate and/or magnitude of such change in such coverage quality over time.

This per-UE level of fading could also be updated over time based on latest coverage-quality records, to establish per UE a latest such representative measure of fading. And as noted above, this level of fading could be focused specifically on instances of coverage-quality fluctuation to or from a level of coverage quality that is deemed particularly poor, such as a predefined threshold low level of RSRP or CQI for instance. For instance, the computing system could omit from the analysis coverage-quality fluctuation that does not involve threshold poor coverage quality, so as to focus on scenarios where UEs have moved into or out of poor coverage quality of the 5G cell 18.

In addition, over a sliding window of time, the data or computing system could roll up the latest such levels of fading for multiple UEs served by the 5G gNB 14 in the 5G cell 18, to establish a latest representative measure of fading of the 5G cell 18. For instance, the computing system could maintain a running average of the most recently determined level of fading of UEs served in the 5G cell 18, as a latest level of fading of the 5G cell 18. Other methods to establish the level of fading of the 5G cell 18 could be possible as well.

Still further, the data or computing system could establish an historical such level of fading of the 5G cell 18 per time of day or on another calendar basis, to facilitate predicting what the level of fading of the 5G cell 18 is likely to be at a current time of day based on what the level of fading of the 5G cell 18 has been on past days at or around the same time of day for instance.

With this data, the computing system could determine based on an actual or predicted level of fading of the 5G cell 18 whether the 4G eNB 12 should operate in the blind-addition mode with respect to the 5G cell 18 or should rather operate in the threshold-based addition mode with respect to the 5G cell 18. For example, if and when the level of fading of the 5G cell 18 is greater than a predefined level of fading (e.g., defined for present purposes), the computing system could determine that the 4G eNB 12 should operate in the threshold-based addition mode rather than in the blind addition mode. Whereas, if and when the level of fading of the 5G cell 18 is less than the predefined level of fading, the computing system could determine that the 4G eNB 12 should operate in the blind-addition mode rather than in the threshold-based addition mode.

And the computing system could accordingly cause the 4G eNB 12 to operate in the determined mode, as noted above.

In an example implementation, the computing system could generally carry out this process from time to time to put the 4G eNB 12 in the desired mode of operation. Alternatively or additionally, the computing system could carry out this process specifically at the time the 4G eNB 12 would configure EN-DC service for a UE—such as when an EN-DC-capable UE connects with the 4G eNB. For example, when the 4G eNB 12 would configure EN-DC service for a UE, the 4G eNB 12 could carry out this process as the computing system and/or could query an external computing system, to determine which mode the 4G eNB 12 should operate in. And the 4G eNB 12 could then operate in that determined mode.

Further, as discussed above, the 4G eNB 12 may generally operate by default in the blind-addition mode with respect to the 5G cell 18, and, based on the level of fading of the 5G cell 18 being threshold high, the computing system could cause the 4G eNB 12 to transition from operating in the blind-addition mode to operating instead in the threshold-based-addition mode. In addition, based on subsequently determining that the level of fading of the 5G cell 18 is no longer threshold high, the computing system could cause the 4G eNB 12 to then revert to operate in the default, blind-addition mode.

The 4G eNB 12 could then operate in the selected mode with respect to setting up EN-DC service for a given UE. Thus, if the selected mode is the blind-addition mode, then the 4G eNB 12 could proceed directly with the SgNB-addition process to add for the UE a secondary connection in the 5G cell 18, without requiring as a condition precedent (for so proceeding with the SgNB-addition process) that that the UE report being within threshold strong coverage of the 5G cell 18. Whereas, if the selected mode is the threshold-based-addition mode, then the 4G eNB 12 could provide the UE with a B1 measurement object and, if and when the 4G eNB 12 receives from the UE an associated B1 measurement report indicating that the UE is within threshold strong coverage of the 5G cell 18, the 4G eNB 12 could then proceed with the SgNB-addition process to add for the UE a secondary connection in the 5G cell 18.

Figure 2:
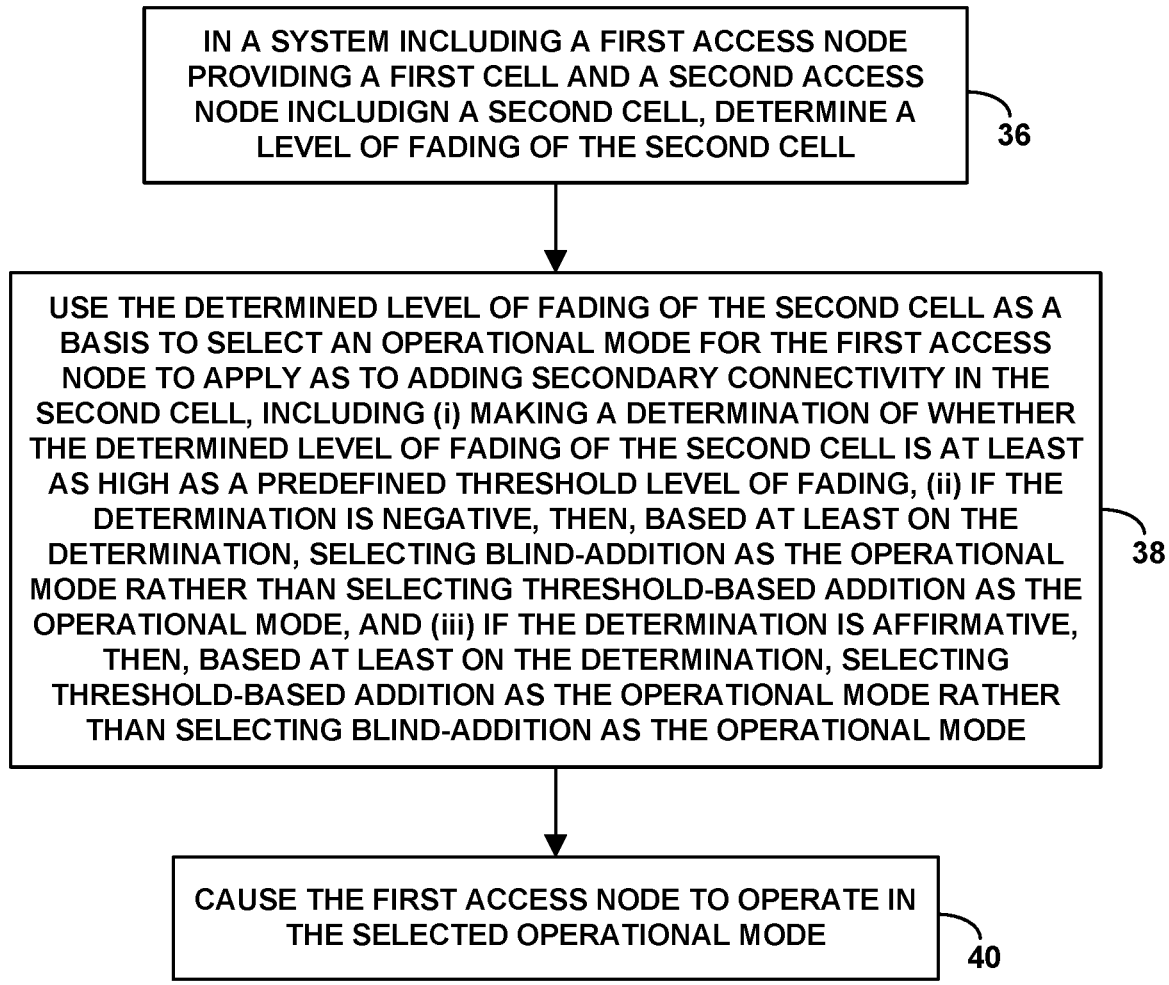
FIG. 2 is a flow chart depicting an example method in accordance with the disclosure.

FIG. 2 is a flow chart depicting an example method that could be carried out to control an operational mode of a first access node in a wireless communication system including the first access node and a second access node, where the first access node provides a first cell and the second access node provides a second cell.

As shown in FIG. 2, at block 36, the method includes determining a level of fading of the second cell. At block 38, the method then includes using the determined level of fading of the second cell as a basis to select an operational mode for the first access node to apply as to adding secondary connectivity in the second cell, with the using including (i) making a determination of whether the determined level of fading of the second cell is at least as high as a predefined threshold level of fading, (ii) if the determination is negative, then, based at least on the determination, selecting blind-addition as the operational mode rather than selecting threshold-based addition as the operational mode, and (iii) if the determination is affirmative, then, based at least on the determination, selecting threshold-based addition as the operational mode rather than selecting blind-addition as the operational mode. And at block 40, the method includes causing the first access node to operate in the selected operational mode.

In line with the discussion above, the act of determining the level of fading of the second cell could involve referring to data that indicates (directly or indirectly) the level of fading of the second cell. Further, as discussed above, the level of fading of the second cell could be a representative measure of levels of fading experienced by multiple UEs served by the second access node in the second cell. And the levels of fading experienced by the multiple UEs served by the second access node in the second cell could comprise, for each UE of the multiple UEs, a measure of fluctuation of coverage experience by the UE over time in the second cell. Still further, the method could include limiting the determining of the level of fading of the second cell to fading to or from threshold poor coverage quality of the second cell.

As additionally discussed above, as to a given UE connected with the first access node in the first cell, (i) the act of operating in the blind-addition mode could involve the first access node adding for the UE a secondary connection with the second access node in the second cell without requiring, as a condition precedent, the UE reporting being within threshold strong coverage of the second cell, and (ii) the act of operating in the threshold-based addition mode could involve the first access node adding for the UE the secondary connection with the second access node in the second cell contingent on the UE reporting being within threshold strong coverage of the second cell.

And the act of the UE reporting being within threshold strong coverage of the second cell could involve the UE transmitting to the first access node a measurement report indicating that the UE is within threshold strong coverage of the second cell. For instance, if the first cell operates according to a first RAT (e.g., 4G LTE) and the second cell operates according to second RAT (e.g., 5G NR), the measurement report could be a B1 measurement report. And adding the secondary connection could establish EN-DC for the UE.

As further noted above, this method could be carried out by the first access node, in which case the first access node could configure itself to operate in the selected mode. Or the method could be carried out at least in part by an entity other than the first access node, in which case causing the first access node to operate in the selected operational mode could involve sending to the first access node a control signal interpretable by the first access node to cause the first access node to operate in the selected operational mode.

Still further, as discussed above, the first access node could operate by default in the blind-addition mode, in which case causing the first access node to operate in the selected operational mode could involve controlling whether to transition the first access node from operating in the blind-addition mode to operating instead in the threshold-based addition mode. For instance, if the decision is for the first access node to operate in the threshold-based-addition mode, then the act of causing the first access node to operate in the selected operational mode could involve reconfiguring the first access node to instead operate in the threshold-based-addition mode.

Figure 3:
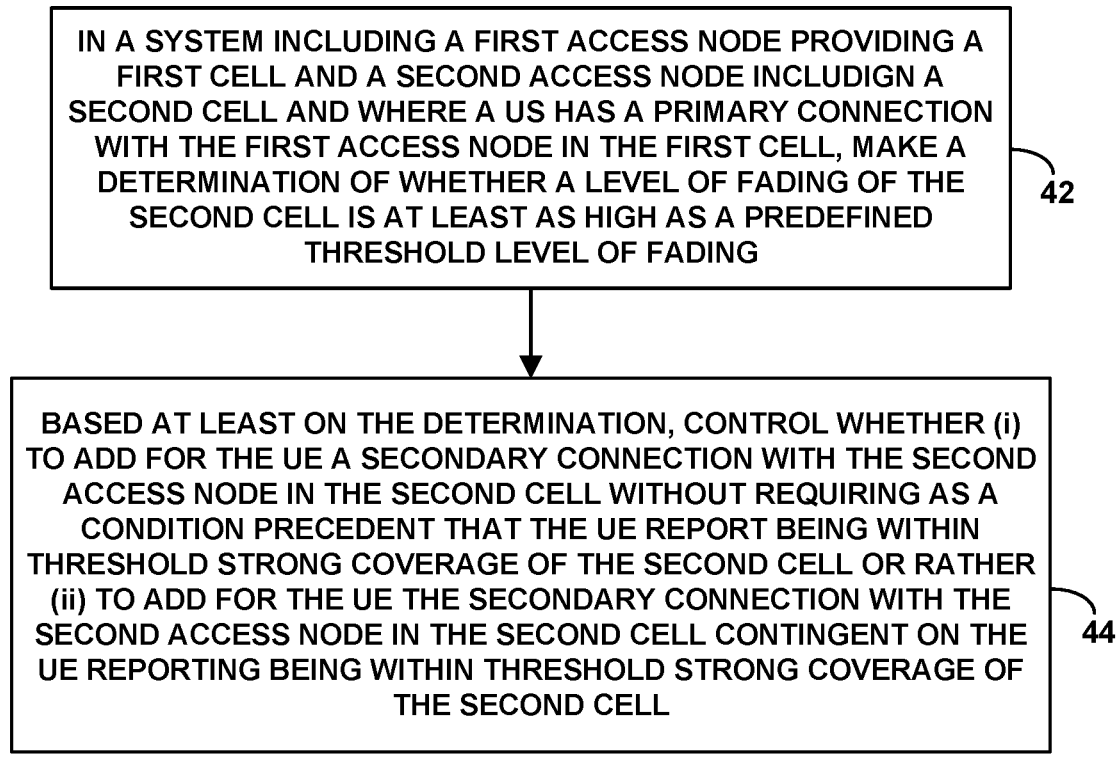
FIG. 3 is another flow chart depicting an example method in accordance with the disclosure.

FIG. 3 is next another flow chart depicting a method that could be carried out to control an operational mode of a first access node in a wireless communication system including the first access node and a second access node, where the first access node provides a first cell and the second access node provides a second cell. This method could be carried out, by way of example, when a UE has a primary connection with the first access node in the first cell and is not connected with the second access node. And the method could be carried out by the first access node.

As shown in FIG. 3, at block 42, the method includes making a determination of whether a level of fading of the second cell is at least as high as a predefined threshold level of fading. And at block 44, the method includes, based at least on the determination, controlling whether (i) to add for the UE a secondary connection with the second access node in the second cell without requiring as a condition precedent that the UE report being within threshold strong coverage of the second cell or rather (ii) to add for the UE the secondary connection with the second access node in the second cell contingent on the UE reporting being within threshold strong coverage of the second cell.

Various features described elsewhere herein can be implemented in this context as well, and vice versa.

For instance, the controlling could involve (i) if the determination is that the level of fading of the second cell is not at least as high as the predefined threshold level of fading, then, based at least on the determination, engaging in a process to add for the UE the secondary connection in the second cell without requiring as a condition precedent that the UE report being within threshold strong coverage of the second cell, and (ii) if the determination is that the level of fading of the second cell is at least as high as the predefined threshold level of fading, then, based at least on the determination, engaging in the process to add for the UE the secondary connection in the second cell only upon receiving from the UE a report of the UE being in threshold strong coverage of the second cell.

Still further, the controlling could involve, responsive to the determination being that the level of fading of the second cell is at least as high as the predefined threshold level of fading, transmitting to the UE a measurement object (e.g., a B1 measurement object) that causes the UE to scan for coverage of the second cell and to transmit to the first access node a measurement report (e.g., a B1 measurement report) if and when the coverage of the second cell is at least as strong as a predefined coverage-strength threshold.

Figure 4:
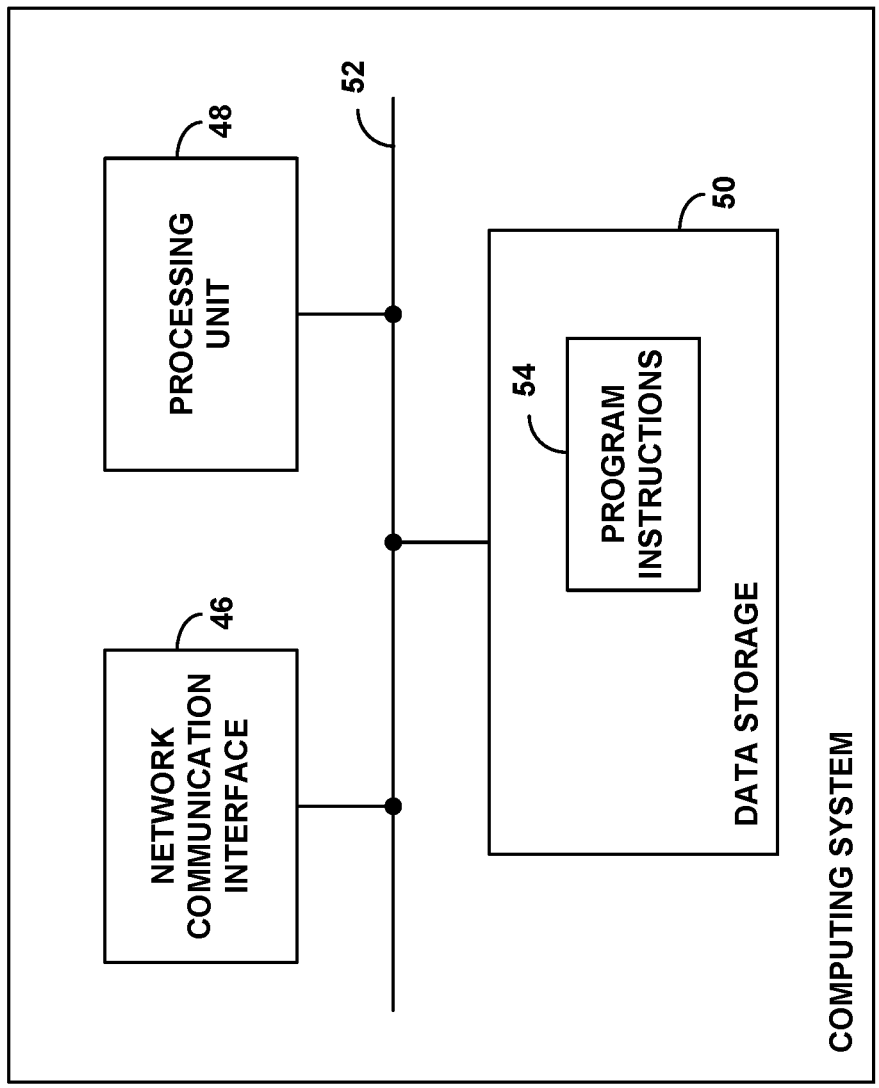
FIG. 4 is a simplified block diagram of an example computing system operable in accordance with the disclosure.

FIG. 4 is next a simplified block diagram of an example computing system that could control an operational mode of a first access node in a wireless communication system including the first access node and a second access node, where the first access node provides a first cell and the second access node provides a second cell. As noted above, this computing system could be provided at the first access node, the second access node, and/or an EMS, among other possibilities.

As shown in FIG. 4, the example computing system includes a network communication interface 46, a processing unit 48, and non-transitory data storage 50, all of which could be integrated together and/or interconnected by a system bus, network, or other connection mechanism 52.

The network communication interface 46 could comprise a physical network connector and associated communication logic (e.g., protocol stacks) to facilitate network communication with various other entities. The processing unit 48 could comprise one or more general purpose processors (e.g., microprocessors) and/or one or more special-purpose processors (e.g., application specific integrated circuits). And the non-transitory data storage 50 could comprise one or more volatile and/or non-volatile storage components (e.g., magnetic, optical, or flash storage), necessarily non-transitory.

As shown, the data storage 50 could then store program instructions 54, which could be executable by the processing unit 48 to cause the computing system to carry out various operations described herein, such as the operations depicted and described with respect to FIG. 2 or FIG. 3 for instance.

Various other features described herein could be implemented in this context as well, and vice versa.

Figure 5:
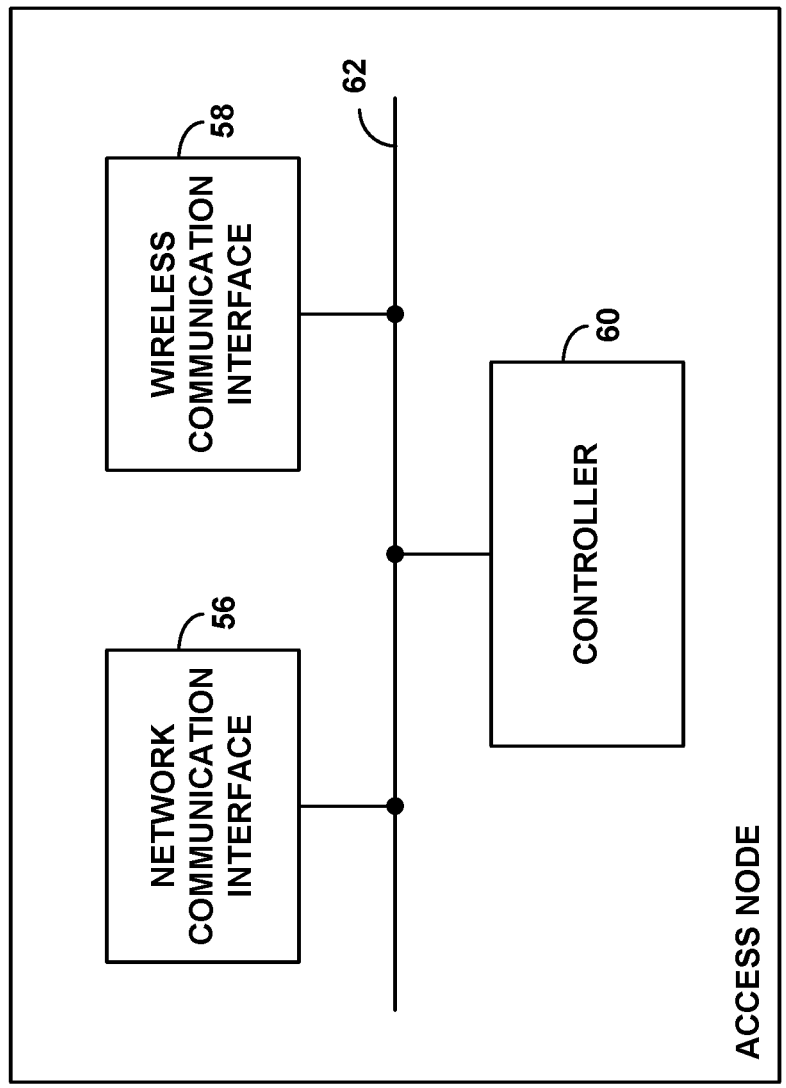
FIG. 5 is a simplified block diagram of an example access node operable in accordance with the disclosure.

FIG. 5 is next a simplified block diagram of an example first access node that could operate in a wireless communication system such as that noted above for example, to carry out various features described herein. As shown, the example first access node includes a network communication interface 56, a wireless communication interface 58, and a controller 60, all of which could be integrated together and/or communicatively linked together by a system bus, network, or other connection mechanism 62.

In an example implementation, the network communication interface 56 could comprise a wired or wireless interface, such as an Ethernet network communication interface, configured to support backhaul communication on a core network and with one or more other access nodes such as inter-access-node communication with the second access node. And the wireless communication interface 58 could comprise an antenna structure, which could be tower mounted or could take other forms, and associated components such as a power amplifier and a wireless transceiver, so as to facilitate providing a cell defining an air interface and engaging air-interface communication in the cell.

Further, the controller 60 (which might be provided by a baseband unit of the access node, for instance) could comprise one or more processing units (e.g., one or more general purpose processors and/or specialized processors) programmed to cause the access node to carry out various operations such as those discussed herein, including for example the operations of FIG. 2 or FIG. 3.

Various other features described herein could be implemented in this context as well, and vice versa.

The present disclosure also contemplates at least one non-transitory computer readable medium having stored thereon (e.g., being encoded with) program instructions executable by at least one processing unit to carry out various operations described above.

Exemplary embodiments have been described above. Those skilled in the art will understand, however, that changes and modifications may be made to these embodiments without departing from the true scope and spirit of the invention.

What is claimed is:

1. A method for controlling an operational mode of a first access node in a wireless communication system including the first access node and a second access node, wherein the first access node provides a first cell and the second access node provides a second cell, the method comprising:
determining a level of fading of the second cell;
using the determined level of fading of the second cell as a basis to select an operational mode for the first access node to apply as to adding secondary connectivity in the second cell, wherein the using includes (i) making a determination of whether the determined level of fading of the second cell is at least as high as a predefined threshold level of fading, (ii) if the determination is negative, then, based at least on the determination, selecting blind-addition as the operational mode rather than selecting threshold-based addition as the operational mode, and (iii) if the determination is affirmative, then, based at least on the determination, selecting threshold-based addition as the operational mode rather than selecting blind-addition as the operational mode; and
causing the first access node to operate in the selected operational mode.

2. The method of claim 1, wherein determining the level of fading of the second cell comprises referring to data that indicates the level of fading of the second cell.

3. The method of claim 1, wherein the level of fading of the second cell is a representative measure of levels of fading experienced by multiple user equipment devices (UEs) served by the second access node in the second cell.

4. The method of claim 3, wherein the levels of fading experienced by the multiple UEs served by the second access node in the second cell comprise, for each UE of the multiple UEs, a measure of fluctuation of coverage experience by the UE over time in the second cell.

5. The method of claim 1, further comprising limiting the determining of the level of fading of the second cell to fading to or from threshold poor coverage quality of the second cell.

6. The method of claim 1, wherein, as to a user equipment device (UE) connected with the first access node in the first cell:
operating in the blind-addition mode comprises the first access node adding for the UE a secondary connection with the second access node in the second cell without requiring, as a condition precedent, the UE reporting being within threshold strong coverage of the second cell; and
operating in the threshold-based addition mode comprises the first access node adding for the UE the secondary connection with the second access node in the second cell contingent on the UE reporting being within threshold strong coverage of the second cell.

7. The method of claim 6, wherein the UE reporting being within threshold strong coverage of the second cell comprises the UE transmitting to the first access node a measurement report indicating that the UE is within threshold strong coverage of the second cell.

8. The method of claim 7, wherein the first cell operates according to a first radio access technology (RAT), the second cell operates according to a second RAT, and the measurement report comprises a B1 measurement report.

9. The method of claim 8, wherein the first RAT is 4G Long Term Evolution (4G LTE), wherein the second RAT is 5G New Radio (5G NR), and wherein adding the secondary connection establishes, for the UE, EUTRA-NR dual connectivity (EN-DC).

10. The method of claim 1, wherein the method is carried out by the first access node.

11. The method of claim 1, wherein the method is carried out at least in part by an entity other than the first access node, and wherein causing the first access node to operate in the selected operational mode comprises sending to the first access node a control signal interpretable by the first access node to cause the first access node to operate in the selected operational mode.

12. The method of claim 1, wherein the first access node operates by default in the blind-addition mode, and wherein causing the first access node to operate in the selected operational mode comprises controlling whether to transition the first access node from operating in the blind-addition mode to operating instead in the threshold-based addition mode.

13. A method for controlling operation of a first access node in a wireless communication system including the first access node and a second access node, wherein the first access node provides a first cell and the second access node provides a second cell, the method comprising, while a user equipment device (UE) has a primary connection with the first access node in the first cell and is not connected with the second access node:
making a determination of whether a level of fading of the second cell is at least as high as a predefined threshold level of fading; and
based at least on the determination, controlling whether (i) to add for the UE a secondary connection with the second access node in the second cell without requiring as a condition precedent that the UE report being within threshold strong coverage of the second cell or rather (ii) to add for the UE the secondary connection with the second access node in the second cell contingent on the UE reporting being within threshold strong coverage of the second cell.

14. The method of claim 13, wherein the method is carried out by the first access node.

15. The method of claim 13, wherein controlling, based at least on the determination, whether (i) to add for the UE the secondary connection in the second cell without requiring as a condition precedent that the UE report being within threshold strong coverage of the second cell or rather (ii) to add for the UE the secondary connection in the second cell contingent on the UE reporting being within threshold strong coverage of the second access node comprises:
if the determination is that the level of fading of the second cell is not at least as high as the predefined threshold level of fading, then, based at least on the determination, engaging in a process to add for the UE the secondary connection in the second cell without requiring as a condition precedent that the UE report being within threshold strong coverage of the second cell; and
if the determination is that the level of fading of the second cell is at least as high as the predefined threshold level of fading, then, based at least on the determination, engaging in the process to add for the UE the secondary connection in the second cell only upon receiving from the UE a report of the UE being in threshold strong coverage of the second cell.

16. The method of claim 13, wherein controlling, based at least on the determination, whether (i) to add for the UE the secondary connection in the second cell without requiring as a condition precedent that the UE report being within threshold strong coverage of the second cell or rather (ii) to add for the UE the secondary connection in the second cell contingent on the UE reporting being within threshold strong coverage of the second cell further comprises:

responsive to the determination being that the level of fading of the second cell is at least as high as the predefined threshold level of fading, transmitting to the UE a measurement object that causes the UE to scan for coverage of the second cell and to transmit to the first access node a measurement report if and when the coverage of the second cell is at least as strong as a predefined coverage-strength threshold.

17. The method of claim 16, wherein the measurement object is a B1 measurement object, and wherein the measurement report is a B1 measurement report.

18. A computing system comprising:

a processing unit;

non-transitory data storage; and program instructions stored in the non-transitory data storage and executable by the processing unit to carry out operations for controlling an operational mode of a first access node in a wireless communication system including the first access node and a second access node, wherein the first access node provides a first cell and the second access node provides a second cell, and wherein the operations include:

determining a level of fading of the second cell, using the determined level of fading of the second cell as a basis to select an operational mode for the first access node to apply as to adding secondary connectivity in the second cell, wherein the using includes (i) making a determination of whether the determined level of fading of the second cell is at least as high as a predefined threshold level of fading, (ii) if the determination is negative, then, based at least on the determination, selecting blind-addition as the operational mode rather than selecting threshold-based addition as the operational mode, and (iii) if the determination is affirmative, then, based at least on the determination, selecting threshold-based addition as the operational mode rather than selecting blind-addition as the operational mode, and causing the first access node to operate in the selected operational mode.

19. The computing system of claim 18, wherein the computing system is at the first access node.

20. The computing system of claim 18, wherein, as to a user equipment device (UE) connected with the first access node in the first cell:

operating in the blind-addition mode comprises the first access node adding for the UE a secondary connection with the second access node in the second cell without requiring, as a condition precedent, the UE reporting being within threshold strong coverage of the second cell; and operating in the threshold-based addition mode comprises the first access node adding for the UE the secondary connection with the second access node in the second cell contingent on the UE reporting being within threshold strong coverage of the second cell.

* * * * *